(12) United States Patent
Hüser et al.

(10) Patent No.: US 9,212,660 B2
(45) Date of Patent: Dec. 15, 2015

(54) VANE PUMP APPARATUS AND METHOD

(75) Inventors: Theodor Hüser, Geseke (DE); Alexander Rüther, Olsberg (DE); Udo Schubert, Paderborn (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 370 days.

(21) Appl. No.: 13/479,997

(22) Filed: May 24, 2012

(65) Prior Publication Data

US 2013/0052057 A1  Feb. 28, 2013

Related U.S. Application Data

(63) Continuation of application No. PCT/EP2010/068197, filed on Nov. 25, 2010.

(30) Foreign Application Priority Data

Nov. 26, 2009  (DE) .......................... 10 2009 055 945

(51) Int. Cl.
| | | |
|---|---|---|
| F04B 17/00 | (2006.01) | |
| F04C 15/00 | (2006.01) | |
| F04C 2/344 | (2006.01) | |
| F04C 18/344 | (2006.01) | |
| F04C 29/00 | (2006.01) | |
| F16D 1/08 | (2006.01) | |

(52) U.S. Cl.
CPC ........... *F04C 15/0073* (2013.01); *F04C 2/3446* (2013.01); *F04C 15/008* (2013.01); *F04C 18/3446* (2013.01); *F04C 29/0071* (2013.01); *F16D 1/0876* (2013.01); *F04C 2240/20* (2013.01)

(58) Field of Classification Search
CPC ............... F04C 15/057; F04C 15/0061; F04C 15/0065; F04C 15/0073; F04C 29/0042; F04C 29/005; F04C 29/0057; F04C 29/0071; F04C 29/0078; F04C 15/008; F04C 2240/20; F04C 2/344–2/3448; F04C 18/344–18/3448; F16D 1/0876
USPC .................. 417/410.3; 464/102–105, 160; 403/359.1, 359.6; 418/182
See application file for complete search history.

(56) References Cited

U.S. PATENT DOCUMENTS

| | | | | |
|---|---|---|---|---|
| 4,464,142 A | * | 8/1984 | Bridges et al. .................. | 464/92 |
| 4,958,984 A | * | 9/1990 | Aoi et al. ...................... | 415/55.1 |

(Continued)

FOREIGN PATENT DOCUMENTS

JP         2004332754      * 11/2004    ............. F04C 15/00

OTHER PUBLICATIONS

Machine Translation of Japanese Patent JP-2004332754 to Hosono et al.*

*Primary Examiner* — Peter J Bertheaud
*Assistant Examiner* — Dnyanesh Kasture
(74) *Attorney, Agent, or Firm* — Husch Blackwell LLP

(57) ABSTRACT

A vane pump includes an electric drive unit with an electric motor and a motor shaft, a pump chamber attached on the electric drive unit, and a rotor having a plurality of blades. The rotor is arranged concentrically to the motor shaft within the pump chamber, and the motor shaft is engaged with the rotor by way of a tappet which is connected torsionally rigid with the motor shaft. The tappet has at least one tappet peg, which is engaged in a rotor recess, that corresponds to the tappet peg, wherein the at least one rotor recess has an oval shape, and the tappet peg is contoured in such a way that two first slightly curved contoured sections each form one contact area with one oblong planar section corresponding with one each of the rotor recesses.

8 Claims, 5 Drawing Sheets

(56) References Cited

U.S. PATENT DOCUMENTS

| | | | |
|---|---|---|---|
| 5,692,856 A * | 12/1997 | Newman et al. | 403/352 |
| 5,836,821 A * | 11/1998 | Yamada et al. | 464/89 |
| 6,491,505 B1 * | 12/2002 | Hueser et al. | 417/410.3 |
| 7,572,117 B2 * | 8/2009 | Hosono | 418/171 |
| 2007/0148011 A1 * | 6/2007 | Schulz-Andres | 417/279 |

* cited by examiner

VANE PUMP APPARATUS AND METHOD

CROSS REFERENCE TO RELATED APPLICATIONS

This application claims priority through German Application No. 10 2009 055 945.0 filed Nov. 26, 2009 and Application No. PCT/EP2010/068197 filed on Nov. 25, 2010.

BACKGROUND OF THE INVENTION

Field of the Invention

The present invention relates to a vane pump comprising an electrical drive unit having an electric motor and a motor shaft, a pump chamber attached on the electrical drive unit, and a rotor having a plurality of blades, said rotor being arranged concentrically to the motor shaft within the pump chamber, wherein the motor shaft is engaged with the rotor by way of a tappet connected torsionally rigid with the motor shaft and the tappet comprises at least one tappet peg which is engaged in a rotor recess that corresponds to the tappet peg.

SUMMARY OF THE INVENTION

A variety of embodiments of vane pumps of the type mentioned above, frequently also referred to as rotary blade pumps are known from the prior art. Examples of vane pumps are disclosed in DE 100 24 699 A1, DE 199 36 644 B4, DE 10 2006 058 977 A1, DE 10 2006 058 978 A1, DE 10 2006 058 979 A1 as well as DE 10 2006 058 980 A1.

The realization of the torsionally rigid attachment of the rotor on the drive shaft by means of a tappet comprising one or a plurality of cylinder shaped tappet pegs with a circular cross-section has been disclosed in the prior art. Herein, the tappet peg(s) is/are engaged in recesses of the rotor, which are shaped analogously.

It has been determined that the surface pressure with the contact areas of the rotor recesses is extremely high due to the cylindrical tappet peg geometry. In the process, the tappet pegs can advance deep into the material and the service life of the tappet pegs and/or the rotor can be reduced significantly as a result.

This is where the present invention comes in with the object of providing a vane pump of the type mentioned above, in which the rotor wear can be reduced and hence the service life of the rotor can be increased.

This object is solved with a vane pump comprising an electrical drive unit with an electric motor and a motor shaft; a pump chamber attached to the electrical drive unit; a rotor having a plurality of blades, said rotor being arranged concentrically to the motor shaft within the pump chamber; the motor shaft being engaged with the rotor by way of a tappet which is connected torsionally rigid with the motor shaft; the tappet comprises at least one tappet peg which is engaged in a rotor recess that corresponds to the tappet peg; the at least one rotor recess having an oval shape; and the tappet peg being contoured such that two first curved contoured sections each form one contact area with one oblong planar section of each rotor recess. The subclaims relate to advantageous upgrades of the invention.

A vane pump according to the invention is characterized in that the at least one rotor recess has an oval shape and that the tappet peg is contoured in such a way that two first slightly curved contoured sections each form one contact area with one oblong planar section each of the rotor recess. It has been demonstrated that the surface pressure can be reduced based on the oval design of the at least one rotor recess and the corresponding design of the tappet pegs, and the service life of the rotor can be extended compared to the solutions known from the prior art in which the tappet pegs have a cylindrical shape and a circular cross-section. The reduction of the surface pressure is in particular due to the special contour of the tappet peg, which has enlarged radii in the contact area with the contract surfaces of the rotor recesses. The tappet pegs no longer advance deep into the material because of the reduced surface pressure and the service life of the tappet pegs and/or the rotor can be extended as a result.

In one embodiment, it is proposed that the first contoured sections of the tappet have a greater radius of bend than two second contoured sections, which border on two opposing, in sections essentially semicircular planar sections of the rotor recess.

In order to improve the connection of the rotor with the motor shaft especially in very powerful vane pumps, one embodiment provides that the rotor comprises two rotor recesses and that the tappet comprises two tappet pegs corresponding to the tappet, said tappet pegs being engaged with the rotor recesses. The two rotor recesses are preferably formed inside the rotor offset by 180°. In this embodiment, the tappet pegs are also formed on the tappet offset by 180°.

In order to make the installation of the rotor on the tappet easier, one embodiment provides that each tappet peg extends orthogonally to a diagonal center plane of the rotor.

In another embodiment, it is possible that the cross-section of each tappet peg is designed mirror-symmetrical in relation to two center lines which intersect in a mid-point and are oriented orthogonally to each other.

In order to simplify the creation of the rotor recesses, one embodiment provides that each of the rotor recesses is designed as a longitudinal hole.

In order to make the installation of the tappet easier, one embodiment provides that the tappet is designed circular in sections and extends around the motor shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail based on the attached drawings. In the Figures.

DETAILED DESCRIPTION OF THE PREFERRED EMBODIMENT

Figure 1:
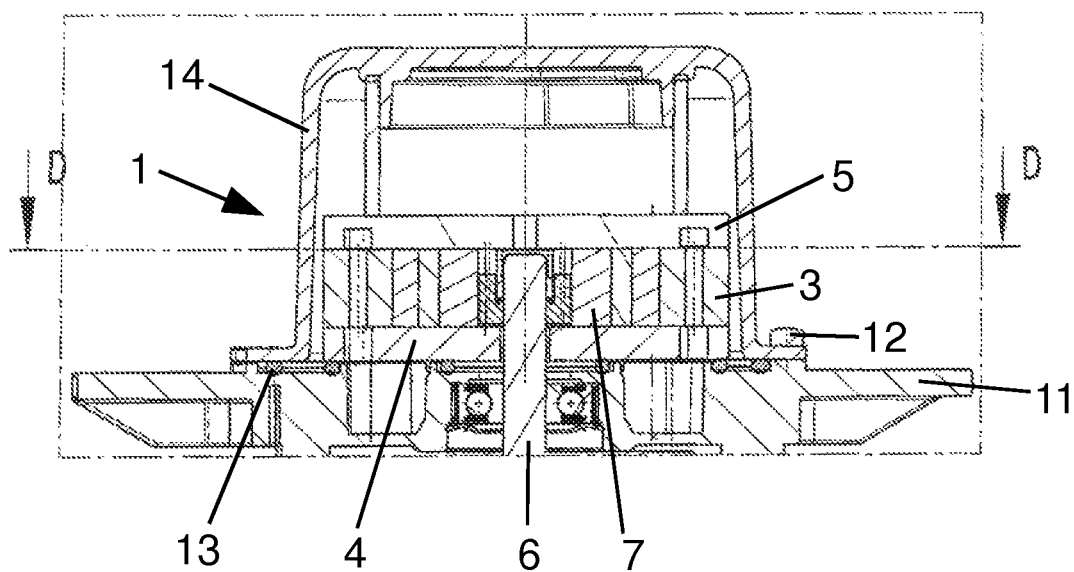
FIG. 1 shows a longitudinal section through a vane pump according to a preferred embodiment of the present invention.
Figure 2:
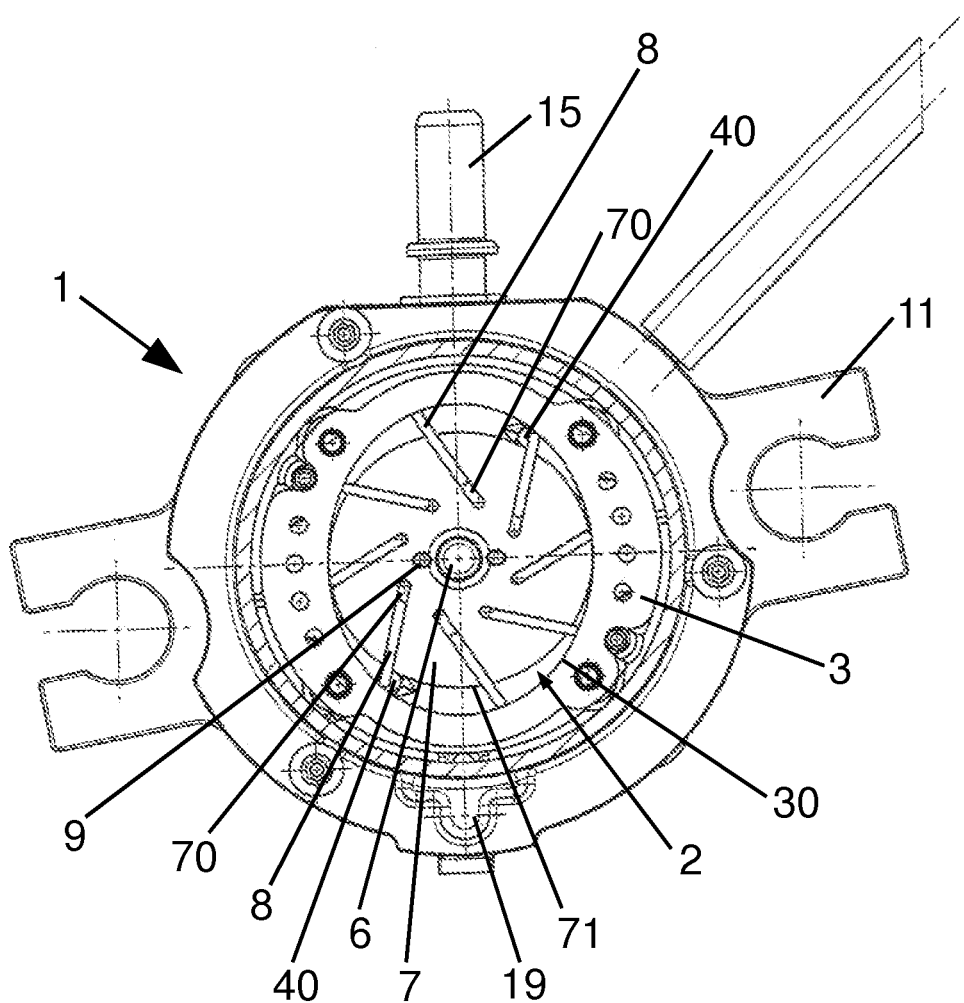
FIG. 2 shows a section through the vane pump along the line D-D according to FIG. 1.

The basic structural design as well as the basic principle of function of a vane pump 1 designed according to a preferred embodiment of the present invention are known from the prior art and are explained in detail below. The vane pump 1 comprises an electrical drive unit housed in a case of the vane pump 1 and has an electric motor with a motor shaft 6. The vane pump 1 (rotary blade pump) can in particular be designed as a vacuum pump for generating a vacuum, which works based on the so-called positive displacement principle. Air or a different fluid medium is vacuumed off during the operation of the vane pump 1 via a fluid inlet channel 15, here designed as fluid inlet connector, and flows into a pump chamber 2 of the vane pump 1 where it is condensed.

The pump chamber 2 comprises a base plate 4 (on the side of the motor), a pump ring 3 as well as a cover plate 5 axially offset to the base plate 4, which are connected with each other. In this exemplary embodiment, the pump ring 3 comprises an elliptical inner contour (such as seen in particular in FIG. 3) with an inside wall 30 shaped accordingly. In an alternative embodiment, it is possible that the pump ring 3 is designed with a circular ring shape and has a circular inner contour.

A cylindrical rotor 7 is arranged on the inside of the pump chamber 2, said rotor being operatively interacting with the motor shaft 6 of the drive unit which extends through a central opening in the base plate 4. During the operation of the vane pump 1, the rotor 7 is driven by the motor shaft 6 of the electric motor, thus causing it to rotate. For this purpose, the rotor 7 is connected torsionally rigid with the motor shaft 6 by way of an analogously shaped tappet 9 whose structural design is explained in more detail below. The tappet 9 itself is attached torsionally rigid on the motor shaft 6 of the electric motor.

Figure 3:
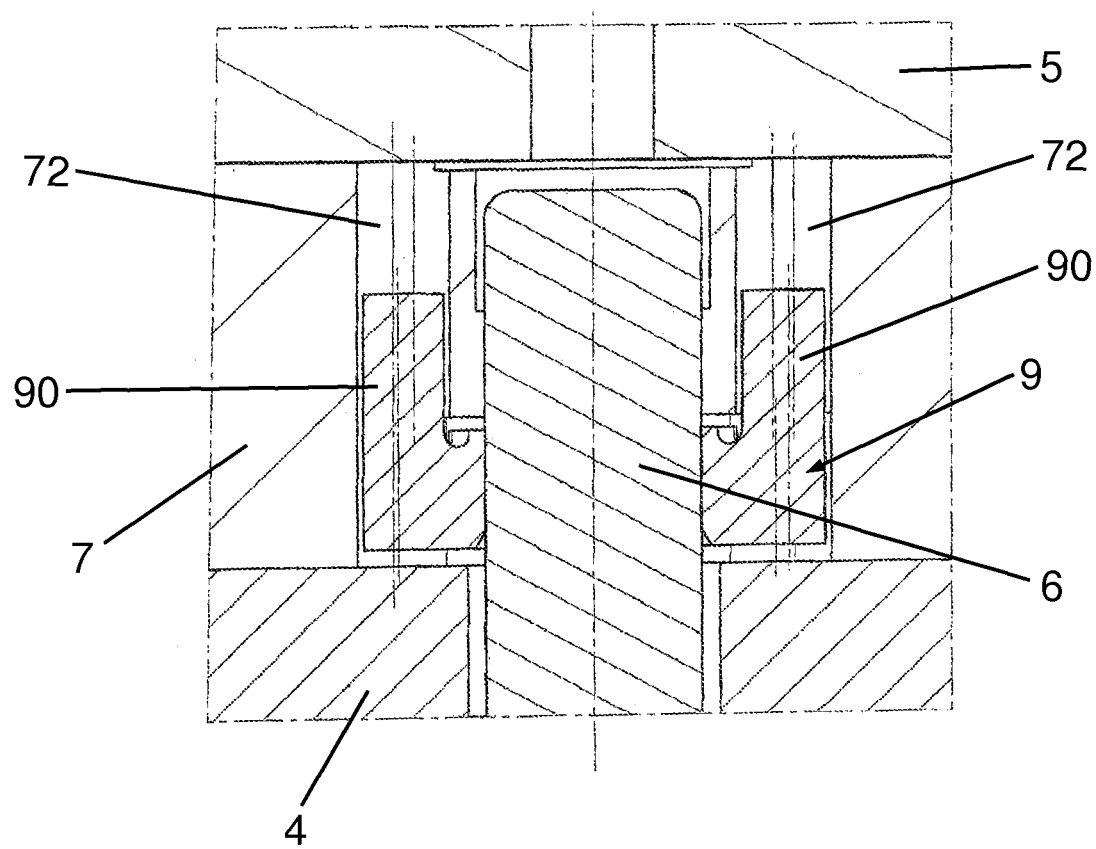
FIG. 3 shows an enlarged detailed representation of the longitudinal section according FIG. 1, depicting the area where the torque is transmitted.

The rotor 7 comprises a plurality of guiding slots 70 which are each suitable for retaining a blade 8. In this exemplary embodiment, the rotor 7 comprises a total of eight guiding slots 70 distributed in the direction of the circumference, which extend from the rotor's exterior circumference inward. One blade 8 each is displaceably arranged in each of the guiding slots 70. During the operation of the vane pump 1, the rotor 7 is driven by the motor shaft 6 of the electric motor, thus causing it to rotate. As illustrated in FIG. 3, the blades 8 create differently sized working cells with the inside wall 30 of the pump ring 3, the outside wall 71 of the rotor 7 and with adjacent blades 8 if any, depending on their rotational position.

Furthermore, the vane pump 1 comprises a mounting plate 11, on which a case not explicitly illustrated here is mounted, said case housing the electric motor. Alternatively, the mounting plate 11 can also be part of the case. Furthermore, a sealing ring 13 is provided which is arranged on the mounting plate 11 for the installation. The sealing ring 13 is suitable for sealing a sound absorber cap 14, which is used to cover the end of the vane pump 1. The sound absorber cap 14 is screwed onto the mounting plate 11 by means of suitable fastening screws 12. During the operation of the vane pump 1, the fluid flows through the fluid inlet channel 15 and from there through corresponding fluid outlet openings in the mounting plate 11 and finally through two fluid inlet openings 40 arranged offset to each other by 180° (and hence opposite of each other) formed on the base plate 4 into the pump chamber 2. The blades 8 of the rotating rotor 7 compress the fluid, pushing it into two fluid outlet openings not explicitly illustrated here, which are preferably provided offset to each other by 180° in the cover plate 5 of the pump chamber 2 and which are preferably arranged offset by about 90° relative to the fluid inlet openings 40 of the base plate 4 and designed as openings with an oblong shape.

Here, the absorption volume of the sound absorption medium 10 is essentially spatially defined by the surface of the cover plate 5 and the sound absorber cap 14, which enclose the absorption volume. After passing through the pump chamber 2, the fluid flows through the two fluid outlet openings of the cover plate 5 into the absorption volume of the sound absorption medium 10. From there, the fluid flows to a fluid outlet channel 19 (see FIG. 3) and exits the vane pump 1 through said outlet channel. If necessary, a pre-sound absorption medium can be provided within the absorption volume.

Figure 4:
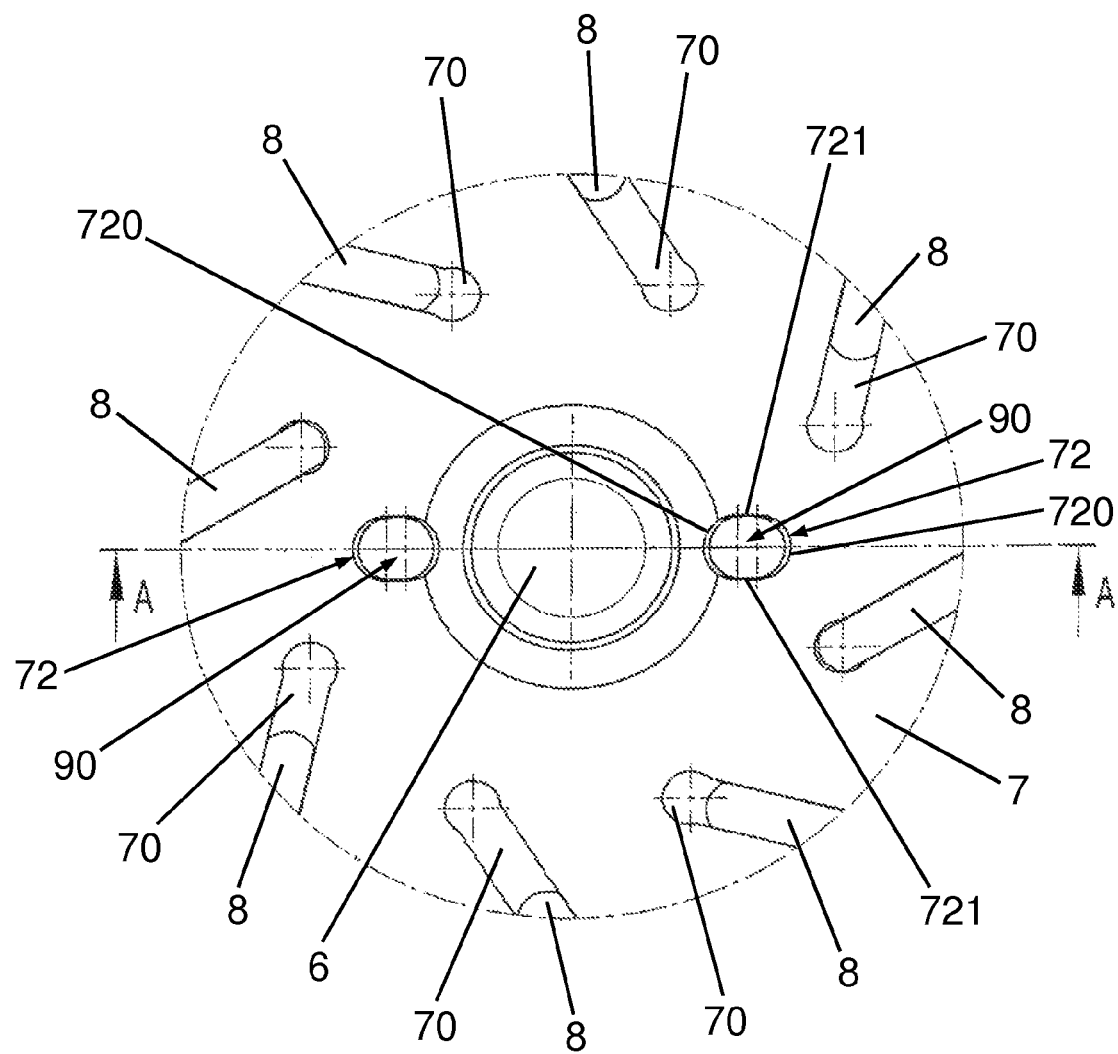
FIG. 4 shows a top view of the rotor of the vane pump.
Figure 5:
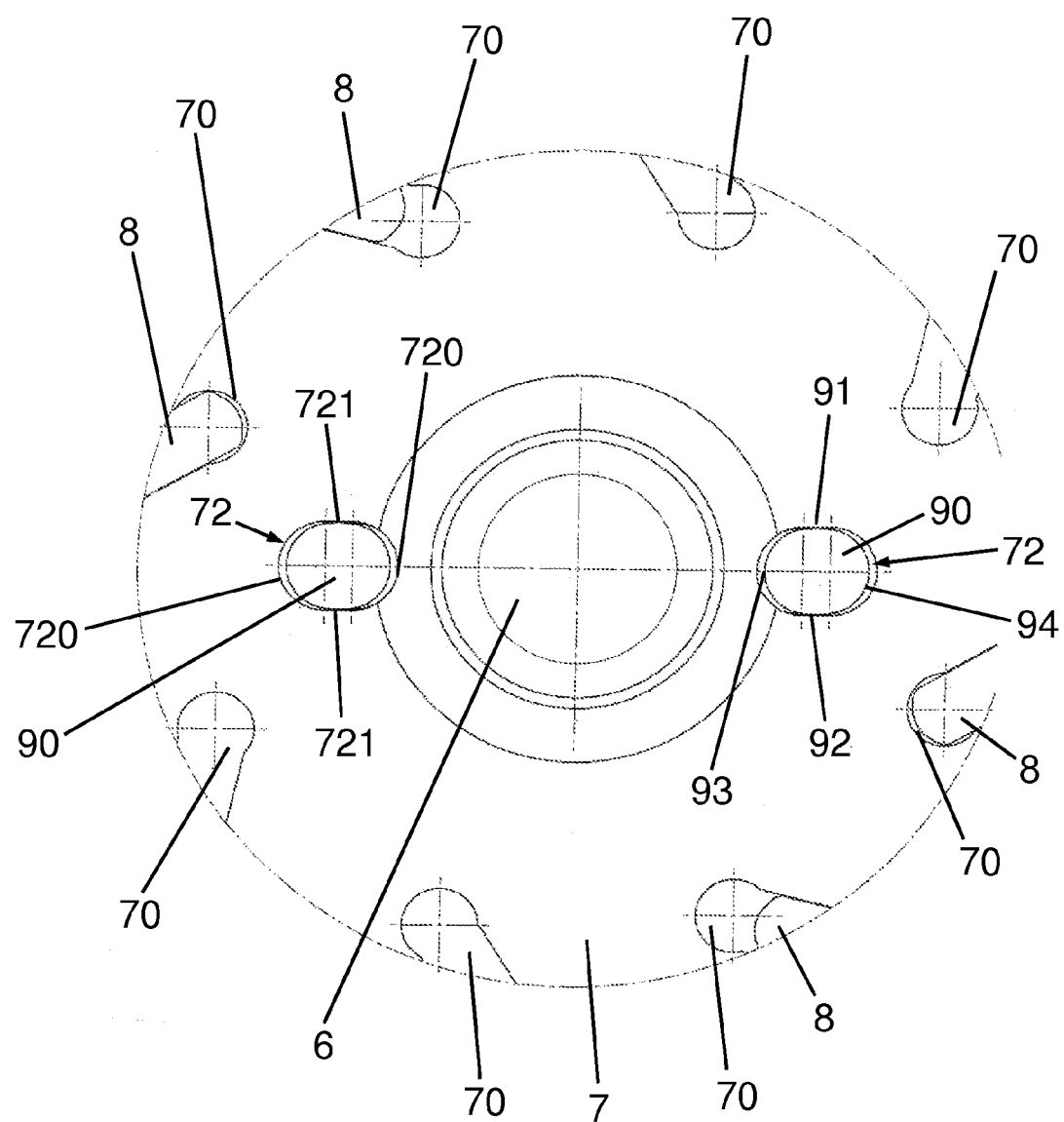
FIG. 5 shows an enlarged representation of FIG. 4.

Further reference to FIGS. 3 to 5, the structural design of the tappet 9 used in the vane pump 1 described above is explained in more detail below. As briefly mentioned above, the rotor 8 is connected torsionally rigid with the motor shaft 6 of the electric motor by means of the tappet 9, the free end of said motor shaft extending through a central opening of the rotor 7. In this exemplary embodiment, the rotor 7 comprises two rotor recesses 72 offset from each other by 180°, which have an oval shape in this case and are designed as longitudinal holes. The tappet 9 is ring-shaped and extends around the motor shaft and is connected torsionally rigid with the motor shaft 6. The tappet 9 comprises two tappet pegs 90 that correspond with the two rotor recesses 72, said tappet pegs also being arranged offset to each other by 180° and extending orthogonally to a diagonal center plane of the rotor 7. The two tappet pegs 90 are shaped in such a way that they can engage with the two rotor recesses 72 of the rotor 7, and are consequently used to transfer the torque of the motor shaft 6 to the rotor 7 of the vane pump 1.

The tappet 9 is designed in such a way that the surface pressure in the longitudinal hole-shaped recesses 72 of the rotor 3 caused by the tappet pegs 90 can be minimized. This is achieved in that the two tappet pegs 90 have an oval cross-section which matches the shape of the oval rotor recesses 72 which the tappet pegs 90 can engage with. As is visible in the enlarged representation in FIG. 5, the cross-section of the two tappet pegs 90 is mirror-symmetrical in relation to two center lines, which intersect in the middle and are oriented orthogonally to each other. In the present case, the outer contour of the tappet pegs 90 comprises four contoured sections 91, 92, 93, 94 with two different radii of bend R1 and R2. The first two contoured sections 91, 92, which are bordering on the straight planar sections 721 of the longitudinal hole-shaped recesses 72 of the rotor 7 are slightly curved and have a radius of bend R1, the size of which is selected in such a way that the surface pressure in the rotor recesses 72 can be minimized.

The radii of the two second contoured sections 93, 94, which are arranged opposite the curved planar sections 720 with an essentially semicircular diameter of the longitudinal hole-shaped recesses 72 and are not touching them, have a radius R2<R1. As a result, the two second contoured sections 93, 94 are significantly more curved than the two first contoured sections 91, 92. The radii of bend R1 of the two first contoured sections 91, 92 are therefore greater than the radii of bend R2 of the two second contoured sections 93, 94. The first contoured sections 91, 92 created in this fashion each form the contact area between the tappet pegs 90 and the straight planar sections 721 of the longitudinal hole-shaped recesses 72. It has been demonstrated that the surface pressure in the recesses 72 can be reduced significantly due to the large radii R1 and the weak bend of the first contoured sections 91, 92 compared to the cylinder-shaped tappets with a circular cross-section. Because of the reduced surface pressure, the tappet pegs 90 no longer advance deep into the material so that the service life of the tappet pegs 90 and/or the rotor 7 can be extended.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

REFERENCE LIST

1 Vane pump
2 Pump chamber
3 Pump ring
4 Base plate
5 Cover plate
6 Motor shaft
7 Rotor
8 Blade
9 Tappet
11 Mounting plate
12 Fastening screw
13 Sealing ring
14 Sound absorber cap
15 Fluid inlet channel
19 Fluid outlet channel
30 Inside wall
70 Guiding slot
71 Outside wall
72 Rotor recess
90 Tappet peg
91 Contoured section
92 Contoured section
93 Contoured section
94 Contoured section
720 Semicircular section
721 Straight section

The invention claimed is:

1. A vane pump comprising:
an electrical drive unit with an electric motor and a motor shaft;
a pump chamber attached to the electrical drive unit;
a rotor having a plurality of blades each arranged in a guiding slot, said rotor being arranged concentrically to the motor shaft within the pump chamber;
the motor shaft being engaged with the rotor by way of a tappet having a torsionally rigid connection with the motor shaft;
the tappet comprises at least one peg which is engaged in at least one rotor recess that corresponds to the at least one peg;
the at least one rotor recess having an oval shape; and
the at least one peg being contoured such that two first curved contoured sections of a said peg each form one contact area with one oblong planar section of a corresponding rotor recess.

2. The vane pump of claim 1, wherein the first contoured sections of the at least one peg have a greater radius of bend than two second contoured sections of the at least one peg which border on two opposing substantially semicircular planar sections of the rotor recess.

3. The vane pump of claim 1, wherein the rotor comprises two rotor recesses and the tappet comprises two pegs which each correspond with a respective rotor recess.

4. The vane pump of claim 3, wherein the two rotor recesses are formed inside the rotor and offset by 180°.

5. The vane pump of claim 1, wherein each peg extends orthogonally to a diagonal center plane of the rotor.

6. The vane pump of claim 1, wherein the cross-section of each peg is symmetrical relative to two center lines which intersect in a mid-point are oriented orthogonally to each other.

7. The vane pump according to claim 1, wherein each of the rotor recesses is designed as a longitudinal hole.

8. The vane pump of claim 1, wherein the tappet is designed substantially circular in sections and extends around the motor shaft.

* * * * *